United States Patent [19]
Bourke

[11] 3,938,020
[45] Feb. 10, 1976

[54] CHARGER CIRCUIT FOR ACCESSORY BATTERY

[75] Inventor: Robert F. Bourke, Wilson, Wis.

[73] Assignee: Gould, Inc., Rolling Meadows, Ill.

[22] Filed: Feb. 11, 1975

[21] Appl. No.: 548,914

[52] U.S. Cl. .................. 320/21; 320/59; 321/2; 321/45 C; 321/15
[51] Int. Cl.² .................. H02J 7/00; H02M 7/44
[58] Field of Search.............. 320/2, 9, 21, 57–59, 320/39, 40; 321/2, 15, 18, 21, 45 R, 45 C; 318/139

[56] References Cited
UNITED STATES PATENTS

| | | | |
|---|---|---|---|
| 3,015,771 | 1/1962 | Mesenhimer | 321/15 |
| 3,609,502 | 9/1971 | Burkett et al. | 320/5 |
| 3,656,046 | 4/1972 | Parke | 321/45 R X |
| 3,663,940 | 5/1972 | Schwarz | 321/45 R |
| 3,736,480 | 5/1973 | Lee | 320/59 X |

*Primary Examiner*—J. D. Miller
*Assistant Examiner*—Robert J. Hickey
*Attorney, Agent, or Firm*—Wolfe, Hubbard, Leydig, Voit & Osann, Ltd.

[57] ABSTRACT

A charging circuit adapted to harvest excess energy from a resonating power circuit and use that energy for charging a battery. Energy is inductively transferred from the power circuit to the charging circuit allowing such circuits to remain electrically isolated. The charging circuit utilizes gate controlled thyristors for coupling the harvested energy to the battery and includes means for gating the thyristors at the proper time with respect to the resonant cycle in the power circuit.

12 Claims, 3 Drawing Figures

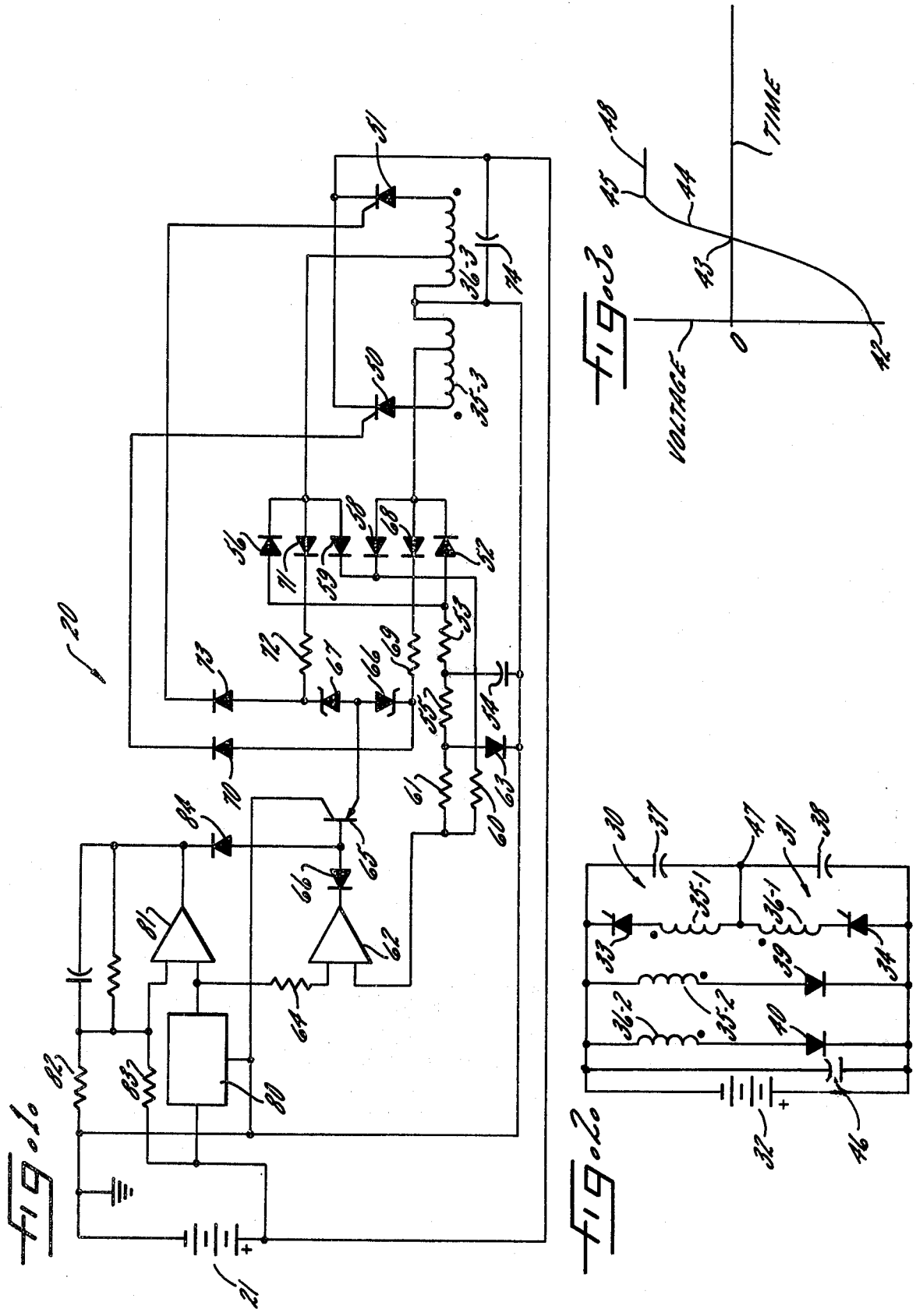

CHARGER CIRCUIT FOR ACCESSORY BATTERY

This invention relates to battery charging circuits and more particularly to such a circuit adapted to harvest excess energy from one circuit for charging a battery in another circuit.

A charging circuit according to the invention, is particularly suited for use with on the road, battery powered vehicles, although, as will become apparent, it is not limited to this use. In such vehicles, the propulsion battery is generally of a relatively high voltage. Since it is desirable to use standard accessories, such as headlights, windshield wipers, etc., it is typical to power the accessories from a separate battery of the standard automobile type. The instant invention is well suited to efficiently and inexpensively charge this auxiliary battery.

If conventional automotive techniques were to be used for charging the accessory battery in an electrically powered vehicle, it would be necessary to provide a generator or an alternator, mechanically coupled to the output shaft of the motor. Such an arrangement, it will be appreciated, would require both a transformation of electrical energy to mechanical energy and a reverse transformation of mechanical energy to electrical energy. At each stage, energy losses would occur which would make the system extremely inefficient from an energy standpoint.

An alternative approach which has previously been known involves the use of a d.c. to d.c. converter, interposed between the propulsion battery and the accessory battery, for performing the required voltage transformation. The major disadvantage of this approach, however, involves the relatively high expense of providing the d.c. to d.c. converter.

To avoid such disadvantage associated with battery chargers heretofore known, it is a general aim of the present invention to provide a system for charging batteries, such as an accessory battery for an electrically powered vehicle, which is characterized by both a high degree of energy efficiency and relatively low cost. In this regard, it is an object of the invention to provide a static charging circuit which harvests excess energy from a primary energy source and applies it to charging a secondary energy source.

According to another aspect of the invention, it is an object to provide a circuit for charging a battery adapted to harvest energy from a resonant power circuit in a manner adapted to minimize the effect upon the operation of such resonant circuit.

A more detailed object of the invention is to provide a charging circuit for a battery having a charging inductor magnetically coupled to a resonating inductor in a power circuit, and having switch means for coupling the charging inductor to the battery at a precise instant in time related to conditions in the power circuit. Further in this regard, it is an object to sense the conditions in the power circuit directly from the charging inductor.

Other objects and advantages will become apparent from the following detailed description, taken in conjunction with the drawings, in which:

FIG. 1 is a schematic drawing showing a charging circuit exemplifying the present invention;

FIG. 2 is a simplified schematic illustrating an inverter circuit usable with the charging circuit of FIG. 1; and FIG. 3 is an exemplary waveform illustrating the operation of the circuit of FIGS. 1 and 2.

While the invention will be described in connection with certain preferred embodiments, it will be understood that there is no intent to limit it to such embodiments, but on the contrary, the intent is to cover all alternatives, modifications and equivalents, included within the spirit and scope of the invention as defined by the appended claims.

While the capability of maintaining the accessory circuit isolated from the resonating circuit is emphasized as a feature of the invention, it will be appreciated that such feature is not essential to the operation of the invention and, if desired, said circuits may be electrically joined.

Turning now to the drawings, FIG. 1 shows a battery charging circuit exemplifying the present invention and suitable for harvesting energy from an electrically isolated resonating circuit and delivering such energy to a battery 21. The resonating circuit may take the form of the inverter configuration illustrated diagrammatically in FIG. 2. It should be noted that the circuit elements illustrated in FIG. 2 comprise a portion of the invention disclosed and claimed in Christianson and Bourke application, Ser. No. 548,911 entitled Electrically Propelled Vehicle, filed concurrently herewith and assigned to the same assignee as the present invention. Accordingly, it will be appreciated that the charging circuit described and claimed herein, is suitable for use in charging the accessory battery of such vehicle.

The resonating circuit of FIG. 2 includes a pair of thyristor controlled inverter circuits 30, 31, serially coupled across a main battery 32. The inverter circuits include SCRs 33, 34, serially coupled with associated resonating inductors 35-1, 36-1. Paralleling the serially connected inductor-SCR combinations, are resonating capacitors 37, 38. Triggering of an SCR establishes a series resonant circuit including the inductor associated with the triggered SCR and the parallel combination of capacitors 37, 38. The capacitors 37, 38 are effectively operated in parallel because of the low power supply impedance at high frequencies, capacitor 41 coupled across the inverter assuring this low impedance.

In operation, the SCRs 33, 34, are alternately triggered, each half cycle causing a resonant exchange of energy between the inductor associated with the triggered SCR and the capacitors, as well as a transfer of energy to the circuit inverters from the battery 32 arming the circuit for its next conductive half cycle. As is well known to those skilled in the art, in a relatively lossless circuit as illustrated, the voltage across the respective capacitors will continue to rise until the voltage rating of the components is exceeded, causing a circuit failure.

The voltage buildup occurs substantially as follows: assuming that when the circuit is powered up the voltage initially divides equally between capacitors 37 and 38, each of such capacitors will be charged to one half battery voltage. When SCR 33 is gated, a resonant exchange of energy occurs between capacitors 37, 38 and inductor 35-1 reversing the charge on the capacitors to self-commutate SCR 33. Thus, after SCR 33 commutates the voltage at the junction 47 between the capacitors is at approximately three halves the battery voltage above the positive bus. When SCR 34 fires to set up a resonant exchange of energy between capacitors 37, 38 and inductor 36-1, current also flows from the power busses through capacitor 37 which causes the voltage across the capacitor to ring in the positive direction until it is approximately five halves battery voltage below the positive bus. Thus, for each half cycle of the inverter, energy is removed from the battery and, because of the relatively low losses in the inverter circuit, the voltage across the commutating capacitors is increased by an amount approximately equal to battery potential. If this were allowed to go unchecked, the voltage would raise to the point where the circuit elements would be destroyed. To prevent this acceleration of potentially destructive voltages, clamping means are generally provided, shown herein as clamping winding 35-2, 36-2, magnetically coupled to resonating winding 35-1, 36-1 respectively and serially connected with associated diodes 40, 41 across the power bus. The turns ratio relating the respective windings is established such that the voltage in the clamping winding forward biases its associated diode at a point when the capacitors 37 or 38 have been charged with sufficient energy to perform the next conductive half cycle.

Turning briefly to FIG. 3, there is shown a voltage versus time representation of a waveform within the circuit of FIG. 2. Assuming that SCR 33 has commutated, the voltage at the junction 47, measured with respect to the positive bus at the instant before firing SCR 34, is illustrated at point 42. Triggering of the SCR 34 causes current flow to discharge the capacitors 37, 38 toward zero volts. At point 43, when the voltage across the capacitors is at zero, the current in the inductor 36-1 is at a maximum. Accordingly, the circuit resonates to recharge the capacitors in the opposite direction as shown by the ascending portion 44. At the point 45, the voltage across inductor 36-2, induced by the rising voltage in inductor 36-1, reaches a value just exceeding the battery voltage, causing diode 40 to become forward biased. Thus, a relatively low impedance path is provided for current in the coil 36-2, absorbing the energy present in the resonating coil 36-1, terminating current flow in the inverter and thus clamping the voltage at the junction 47 at the level illustrated in FIG. 3 as horizontal portion 48. Not only does such an arrangement limit the voltages in the inverter circuit to their desired values, but it increases efficiency as the excess power is returned to the main battery 32.

In accordance with one aspect of the invention, means are provided for harvesting energy from a resonating inductor in a manner which will have minimal effect upon the operation of the resonating circuit. Such operation may be appreciated with reference to FIG. 3 where it is seen that the optimum point for harvesting the energy is immediately before the clamping point 45. If the energy is harvested sooner in time, it is seen that the capacitor voltage will be clamped at a value lower than desired. By way of contrast, if the energy is harvested too late, as on the horizontal portion 48 beyond point 45, the energy will have already been returned to the main battery 32, and charging will be ineffective. Because of the relatively steep slope of the ascending waveform 44, it will be appreciated that the window within which harvesting of the energy must be initiated is rather small.

While the general shape of the waveform shown in FIG. 3 is representative of the operration of the circuit under a vareity of conditions, the overall magnitudes of the voltages vary with changing conditions. More specifically, it will be appreciated that the voltage at which clamping occurs is directly determined by the terminal voltage of the main battery 32. Additionally, the terminal voltage of the main battery varies with such conditions as operating current, state of charge, temperature, etc. Thus, if it were attempted to sense the point 45 by measuring the magnitude of the voltage of the rising waveform 44 until a fixed level were reached, accuracy would be no better than the amount of variation in the terminal voltage of the battery 32 over all operating conditions. The shortcomings of this arrangement will be apparent.

In practicing the invention, means are provided for measuring the magnitude of the negative peak voltage and comparing that magnitude with the rising voltage until such rising voltage reaches a predetermined proportion of the negative peak. I have recognized that irrespective of the voltage magnitudes involved, the clamping point 45 will always be in proportion to the negative peak 42, the particular proportion being determinable for a given circuit. Accordingly, the invention provides means for harvesting the energy from the resonating inductor immediately before the clamping point 45 is reached.

For coupling the charging circuit to the resonating inverter circuit, charging inductors 35-3 and 36-3 are magnetically coupled to resonating inductors 35-1 and 36-1, respectively. As will become more apparent, the charging inductors perform three functions in the illustrative charging circuit, namely, providing signal for controlling the sensing portion of the circuit, providing gating energy for driving the triggered portion of the circuit, and coupling charging energy to the accessory battery itself.

For providing a path to couple charging current to the battery 21, one of the terminals of each of inductors 35-3 and 36-3 are joined and coupled to the negative terminal of the battery. The opposite ends of the inductors are coupled via respective gate controlled switches 50, 51 to the positive terminal of the battery 21. Thus, it is seen that if gate controlled switch 50 or 51 is fired, a path for charging current is provided from the inductor, through the associated switch, to the battery 21.

For sensing the conditions within the resonating inverter circuit, the transformers 35-3 and 36-3 are provided with respective taps coupled to the signal sensing circuitry of the charger. It should, however, be mentioned that untapped transformers might be used if desired, with external attenuation, if necessary, for providing a sensing signal of the proper magnitude.

For providing a first signal related to the peak negative voltage within the inverter, a diode 52 has its cathode coupled to the tap of transformer 35-3 and its anode coupled to a sample and hold circuit comprising resistor 53 and capacitor 54. When the conditions in the inverter circuit induce a negative voltage in charging coil 35-3, current flows upwardly through the capacitor and through resistor 53 and diode 52 to the coil. Current flow increases for increasing values of peak negative voltage. However, once a peak is reached, current flow may not reverse, since there is no low impedance discharge path for capacitor 54. Thus capacitor 54 is charged with a voltage representative of the negative peak in the main inverter circuit. A diode 56, identical in function to diode 52 is coupled to the tap of charging inductor 36-3. Thus, it is seen that both charging inductors use a common sample and hold circuit for providing a signal related to the negative peak in the resonating inverter. The output of the sample and hold circuit is coupled via resistors 55 and 61 to a summing junction at the non-inverting input of an amplifier 62.

For providing a signal representative of the ascending positive voltage in the inverter circuit, a pair of diodes 58, 59 coupled to the taps of the respective charging inductors 35-3 and 36-3 have their common cathodes coupled to a resistor 60, which, in turn is coupled to the summing junction at the non-inverting input of amplifier 62. The inverting input of amplifier 62 is provided with a constant bias via resistor 64. Accordingly, during negative portions of the FIG. 3 waveform, the negative signal from the sample and hold circuit will dominate, and the output of amplifier 62 will be maintained at a low level. However, as the voltage waveform rises, current will be provided to the summing junction via resistor 60, ultimately causing the output of amplifier 62 to switch to a high level. The point at which the amplifier switches is determined by the relative values of resistor 60 with respect to resistors 55 and 61. Such resistors are weighted so that the output of amplifier 62 will be switched to a high level immediately before the operation of the clamping circuits in the inverter. It has been found that the circuit is effective to switch the output of amplifier 62 to a high level just before actuation of the clamping circuitry irrespective of variations in the terminal voltage of the main battery 32.

As a further feature of the sensing circuit means are provided for establishing a lower limit of propulsion battery terminal voltage below which the harvesting of energy by the charging circuit is terminated. To that end, resistor 61 and diode 63 are arranged to establish a fixed negative bias on the non-inverting input of amplifier 62. Accordingly, the positive signal coupled to the summing junction through resistor 60 must exceed the value of the fixed negative bias as a prerequisite for causing amplifier 62 to switch. When the terminal voltage of the main battery 32 is reduced, the clamping voltage will be similarly reduced, and the signal coupled through resistor 60 in response to the positive swing will be incapable of overcoming the aforementioned bias. The output of amplifier 62 will, in such condition, be maintained at a low level, preventing the harvesting of energy from the main inverter.

Neglecting for the moment the circuitry including amplifier 81 and its associated components, it will be seen that when the output of amplifier 62 is at a low level, a current amplifying transistor 65, having its base coupled to the output of the amplifier 62 via a diode 66, will be caused to conduct so as to clamp any positive voltage appearing at its emitter to circuit common. The emitter of the transistor is coupled to a junction between a pair of Zener diodes 66, 67 adapted to isolate the respective gating circuits. It is thus seen that when the voltage on charging inductor 35-3 swings positively, diode 68 will become forward biased and conduct current through resistor 69. However, as the base of transistor 65 is biased at a low level via the output of amplifier 62, current flow will be through Zener diode 66 and the transistor 65 to circuit common. When the amplifier 62 senses that the positive voltage in the charging inductor has reached the necessary predetermined proportion of the negative peak, it switches its output to a high level. Thus, base bias is removed from transistor 65, allowing the current which had previously passed therethrough to be conducted through diode 70 to the gate of SCR 50. As a result, SCR 50 will be driven into conduction to harvest the energy within the resonating inductor 35-1 via the charging inductor 35-3. This energy is, in turn, delivered to the accessory battery 21. It will be appreciated that such triggering initiates energy harvesting well before the clamping circuitry in the inverter takes the excess energy for return to the main battery 32. It is seen that the circuitry for triggering SCR 51, including resistor 72, Zener diode 67 and diode 73, is identical to that associated with SCR 50, and operates in the same manner for harvesting energy from resonating inductor 36-1.

The turns ratio relating the resonating inductors 35-1, 36-1 to their associated charging inductors 35-3, 36-3 is established to determine the conditions under which the harvested energy is delivered to the accessory battery. In other words, at the instant of firing the charging SCR, the amp-turns in the resonating inductor are transferred to the charging inductor. Raising the number of turns in the charging inductor to limit current, has the effect of lengthening the period during which energy is delivered to the accessory battery (the number of volt-seconds taken from the resonating winding must correspond to the number of volt-seconds delivered to the charging winding). In order to enhance the energy harvesting process under such conditions it is desirable to provide means for assisting the capture of the energy shown herein as capacitor 74 coupled across the accessory battery 21 but located in proximity to SCRs 50, 51. Such capacitor is rapidly charged at the instant the charging SCR is fired to immediately take the energy from the resonating inductor and transfer it to the battery.

In order to provide a regulation feature in the charger circuit described herein, means are provided for sensing the terminal voltage of the battery and disabling the charging circuit in the event the terminal voltage indicates the battery requires no charge. Accordingly, a voltage regulator 80, powered by the battery 21, is adapted to produce a stable reference voltage, such as 5 volts. Such stable reference voltage is coupled to the non-inverting input of an amplifier 81. A summing junction is formed at the inverting input of amplifier 81, having a resistor 83 coupled between the positive battery terminal and the junction. Thus, when the battery is at a relative full charge, the summing junction will be maintained at a first comparatively higher voltage, thus maintaining the output of amplifier 81 at a low level. In this condition, transistor 65 will be continuously biased into the on condition irrespective of the action of amplifier 62. Accordingly, when the amplifier 81 senses a full charge on the battery, the charging portion of the circuitry is disabled. However, as the terminal voltage of the battery 21 decreases, indicating the need for a charge, the voltage at the summing junction will decrease, ultimately falling below the reference voltage at the non-inverting input and causing the output of amplifier 81 to be driven to a high level. In this condition the diode 84 will be reverse biased preventing the regulator amplifier 81 from having any effect upon the charging system, allowing the comparison amplifier 62 to trigger the respective SCRs at the proper points in the resonant cycles of the respective inverters.

In an alternative embodiment of the invention, the clamping means, including the clamping windings 35-2, 36-2 and the clamping diodes 39, 40, may be eliminated, the charging circuit serving as a clamp. In such case, the point at which the charging SCRs are fired is important, just as in the previous case, because it determines the recharge voltage in the inverter circuit. Whereas in the previous case the clamp circuit was effective to limit voltages in the inverter if the charging SCRs were fired too late, in the instant case there is no clamping until the charging SCRs fire. It will be appreciated that the particular form of regulator circuit must be modified for use with this alternative embodiment. More specifically, the charging SCRs must be fired for every cycle of the inverter irrespective of the state of charge of the accessory battery. Under conditions when the accessory battery is fully charged, the regulator may, for example, be adapted to cause the energy captured by the charging circuit to be dissipated in an external load.

It will be appreciated that the charging circuit and the battery to be charged are completely isolated from the inverter circuit. Accordingly, the inverter circuit may operate at a resonably high voltage without producing any safety hazards in the low voltage circuit of the accessory battery. Additionally, the triple function of the charging inductor should be noted whereby it provides a sensing signal, provides gating energy, and finally provides the path for coupling charging energy to the battery. The circuit is preferably comprised of low power, low voltage components and therefore may be manufactured relatively inexpensively, further enhancing the desirability thereof.

Finally, it should be noted that the terms "positive" and "negative" have been used for convenience in describing circuit operation with respect to a particular waveform in the context of a particular base or reference; use of the terms, however, is intended to impart no limitation to the invention described and claimed herein.

I claim as my invention:

1. A circuit for charging a battery and usable with a thyristor controlled resonant circuit, said resonant circuit having a resonating inductance, and a clamping inductance magnetically coupled to the resonating inductance for clamping the voltage across said resonant circuit at a clamping point, said charging circuit comprising in combination, a charging inductance inductively coupled to the resonating inductance, detecting means coupled to the charging inductance and responsive to the signal induced therein by the resonating inductance for detecting a point in said signal immediately before the clamping point, and switch means responsive to said detecting means for coupling the charging inductor to the accessory battery for harvesting the energy from the resonating inductance and providing it to said battery for charging the same.

2. A circuit for charging an accessory battery and usable with thyristor circuits of the type including auxiliary commutating circuits, said commutating circuits having commutating inductances therein, said charging circuit comprising in combination, charging inductance means magnetically coupled to the commutating inductance, a gate controlled switch coupling the charging inductance means to the accessory battery, sample and hold means driven by said charging inductance means for providing a sampled signal related to the peak voltage induced in said charging inductance means, sensing means for producing a sensed signal following the voltage induced in said charging inductance means, means for comparing the sampled signal and the sensed signal for producing a firing signal when said sensed signal reaches a magnitude which is a predetermined proportion of said sampled signal, and means coupling the firing signal to the gate of the gate controlled switch for causing said charging inductance means to take energy from the commutating inductance and couple said energy through said switch to the auxiliary battery.

3. The accessory battery charging circuit as set forth in claim 2, wherein said comparing means comprises a summer having a first resistor coupled to said sample and hold means and a second resistor coupled to the sensed signal, the respective values of said resistors establishing said predetermined proportion.

4. The accessory battery charging circuit as set forth in claim 2, further including regulator means responsive to the terminal voltage of the accessory battery for inhibiting said firing signal when the accessory battery is in a charged condition.

5. The accessory battery charging circuit as set forth in claim 2, further including capacitor means coupled across said accessory battery and located in proximity to the gate controlled switch for capturing the energy taken by said charging inductance means.

6. The accessory battery charging circuit as set forth in claim 2, wherein the firing signal producing means includes switch means responsive to the comparing means, and means coupling said charging inductance means to the gate of the gate controlled switch, said switch means being coupled in disabling relationship to said last mentioned means for allowing gating current to flow from the charging inductance means to the gate of the gate controlled switch only when the comparing means detects said predetermined proportion.

7. In a thyristor circuit including resonant inductance and capacitance means, said thyristor circuit being powered from a main battery, said circuit including a clamping inductance magnetically coupled to the resonant inductance, a diode in series with said clamping inductance, said serially connected diode and clamping inductance being coupled across said main battery and adapted to clamp the resonant voltage in said circuit at a predetermined maximum, a circuit for charging an auxiliary battery with energy taken from said resonant circuit comprising in combination, charging inductance means magnetically coupled to said resonant inductance, a gate controlled switch coupling said charging inductance means to the auxiliary battery, means coupled to said charging inductance means for producing a first signal related to the peak voltage in said thyristor circuit, sensing means for producing a second signal following the resonant voltage in said thyristor circuit, comparison means for comparing the first and second signals in a predetermined proportion to produce an enabling signal immediately before said clamping circuit clamps said resonant voltage, and means responsive to said enabling signal for coupling a gating signal to the gate controlled switch, thereby to couple the energy in the resonant inductance to the auxiliary battery for charging the same.

8. The auxiliary battery charging circuit as set forth in claim 7 wherein the means for coupling the gating signal comprises circuit means joining the charging inductance means to the gate of the gate controlled switch, and switch means responsive to said enabling signal for allowing conduction through said circuit means from said charging inductance means to said gate, thereby to trigger said gate controlled switch with energy taken from the resonant inductance.

9. The accessory battery charging circuit as set forth in claim 8, further including regulator means responsive to the terminal voltage of the accessory battery for providing a disabling signal under conditions when the accessory battery is charged, and means coupling said disabling signal to the switch means for inhibiting the gating of said gate controlled switch thereby to disable the charging circuit.

10. A circuit for charging an auxiliary battery for use with an auxiliary commutating inverter, said inverter comprising a pair of thyristor controlled resonant circuits serially coupled across a main battery, each of said resonant circuits including a resonant inductor, clamp means magnetically coupled to the respective resonant inductors for clamping the resonant voltage in the respective resonant circuits to a predetermined maximum, said auxiliary battery charger comprising in combination, first and second charging inductances magnetically coupled to the respective resonant inductors, first and second gate controlled switches coupling said charging inductors to the auxiliary battery, sample and hold means responsive to the charging inductors for providing a sampled signal related to the peak voltage within said resonant circuits, sensing means coupled to the charging inductor for producing signal following the resonant voltage within said resonant circuits, comparison means coupled to the sample and hold means and the sensing means for comparing said sampled signal to said resonant voltage and for producing an enabling signal at the point immediately before the clamping circuit is activated, circuit means coupling the respective gates of the first and second gate controlled switches to the respective charging inductors, switch means for interrupting the circuit means, and means coupling the comparison means to the switch means for allowing said current path in response to the presence of an enabling signal thereby to trigger the gate controlled switches immediately before activation of the clamping circuit to take the energy from the resonant inductor and couple it to the auxiliary battery for charging the same.

11. In a thyristor inverter circuit, powered from a main battery and including resonant inductance means and clamping inductance means magnetically coupled to said resonant inductance means for clamping the voltage across said inverter at a predetermined maximum wherein sufficient energy is present in said inverter for operation of subsequent resonant cycles, a circuit for charging an electrically isolated accessory battery with energy taken from said inverter circuit, said charging circuit comprising in combination, charging inductance means magnetically coupled to said resonant inductance means, sample and hold means coupled to the charging inductance means for providing a signal related to the peak voltage in said inverter circuit, sensing means for providing a second signal following the voltage in said inverter circuit, comparison means including a summer for comparing the first and second signals in a predetermined proportion thereby to detect the point immediately before said clamping means is activated to clamp the voltage across said thyristor circuit, and switch means coupling the charging inductance means to the accessory battery, said switch means being closed by said comparison means to take the energy from the resonant inductance and couple said energy to the accessory battery immediately before the operation of said clamping means, whereby said charging circuit effectively harvests a portion of the energy from said resonant inductance means while leaving sufficient energy in said resonant circuit for operation of subsequent resonant cycles.

12. A circuit for charging an auxiliary battery and usable with thyristor controlled resonant circuits of the type including a resonating inductance, said charging circuit comprising in combination, charging inductance means inductively coupled to the resonating inductance, switch means coupled to the charging inductance means, means for providing a first signal related to the peak voltage induced in said charging inductance means, means for producing a second signal following the voltage induced in said charging inductance means, means for comparing the first and second signals for producing a firing signal when said second signal reaches a magnitude which is a predetermined proportion of said first signal, and means coupling the firing signal to the switch means for causing said charging inductance means to take energy from the resonating inductance.

* * * * *